R. KLEIN & T. BRUECK.
CAMERA SHUTTER.
APPLICATION FILED DEC. 4, 1911.
1,122,950.
Patented Dec. 29, 1914.
4 SHEETS—SHEET 1.
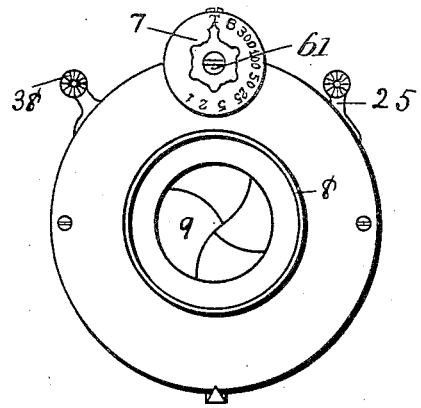
Fig. I.
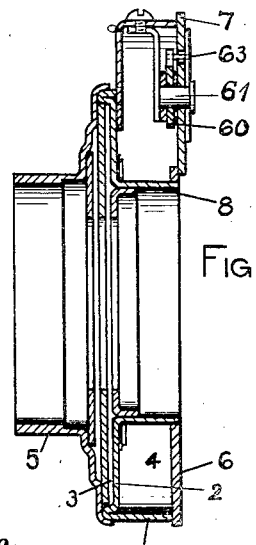
Fig. II.
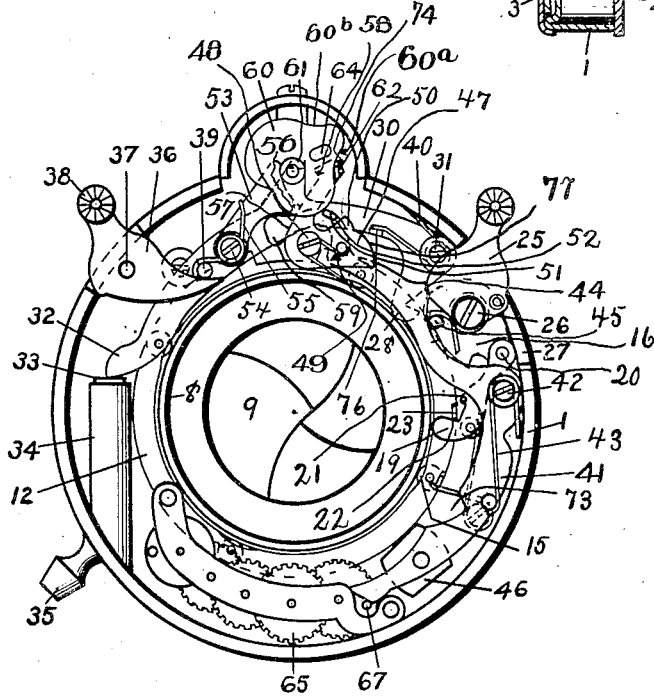
Fig. III.
Witnesses
A. H. Whitmore
L. M. Simms
Inventor
Rudolph Klein and
Theodor Brueck
By H. H. Simms
Their Attorney R. KLEIN & T. BRUECK.
CAMERA SHUTTER.
APPLICATION FILED DEC. 4, 1911.
1,122,950.
Patented Dec. 29, 1914.
4 SHEETS—SHEET 2.
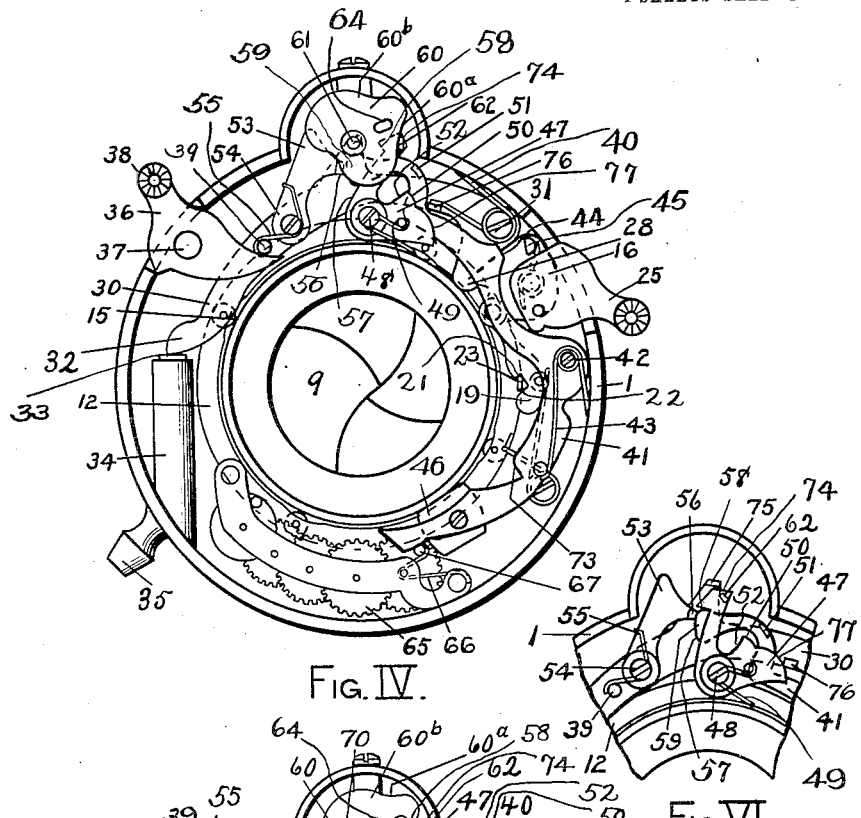
Fig. IV.
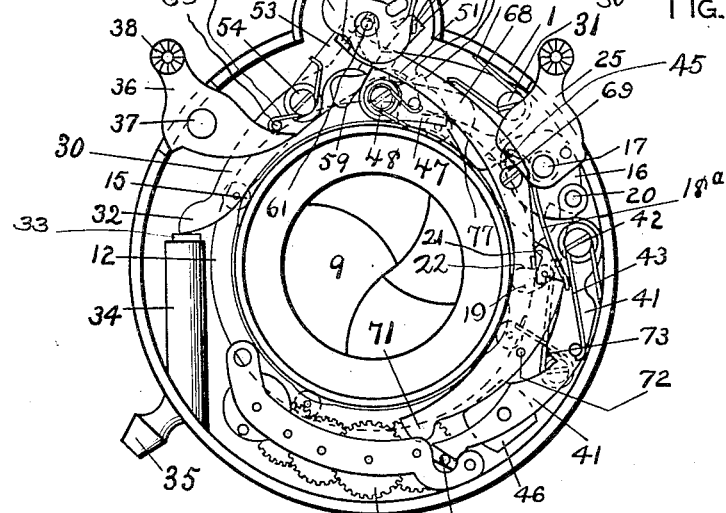
Fig. VI.
Fig. V.
WITNESSES:
Ada W. Whitmore.
Leroy M. Simms
INVENTOR
Rudolph Klein and
Theodor Brueck
BY H. S. Simms
Their ATTORNEY R. KLEIN & T. BRUECK.
CAMERA SHUTTER.
APPLICATION FILED DEC. 4, 1911.
1,122,950.
Patented Dec. 29, 1914.
4 SHEETS—SHEET 3.
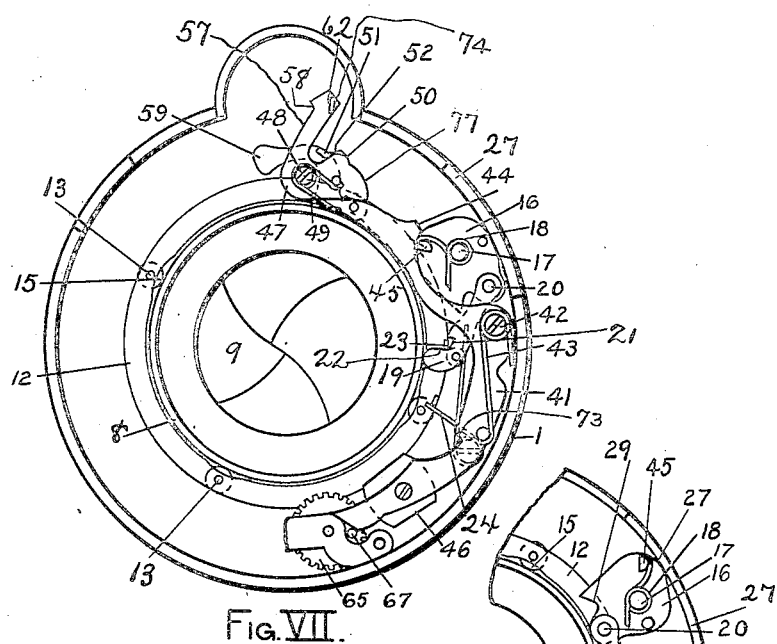
Fig. VII.
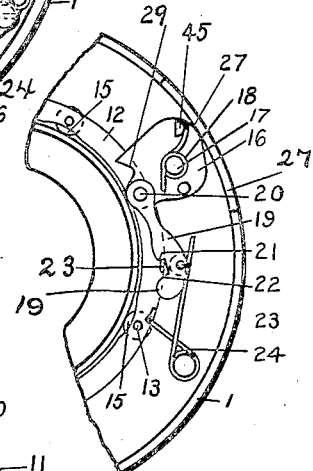
Fig. VIII.
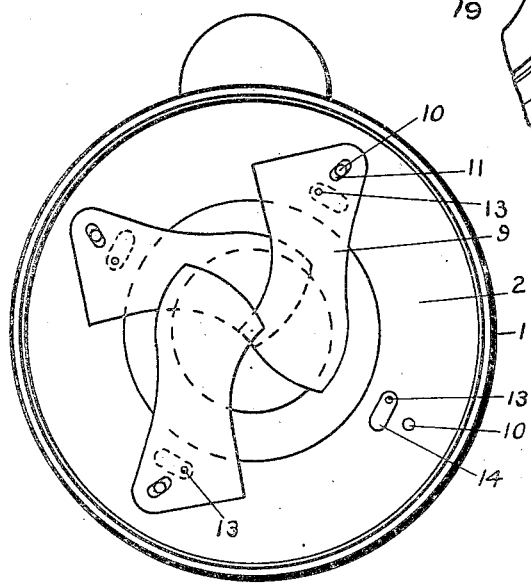
Fig. IX.
WITNESSES:
A. M. Whitmore
L. M. Simms
INVENTOR
Rudolf Klein
Theodor Brueck
BY H. H. Simms
their ATTORNEY

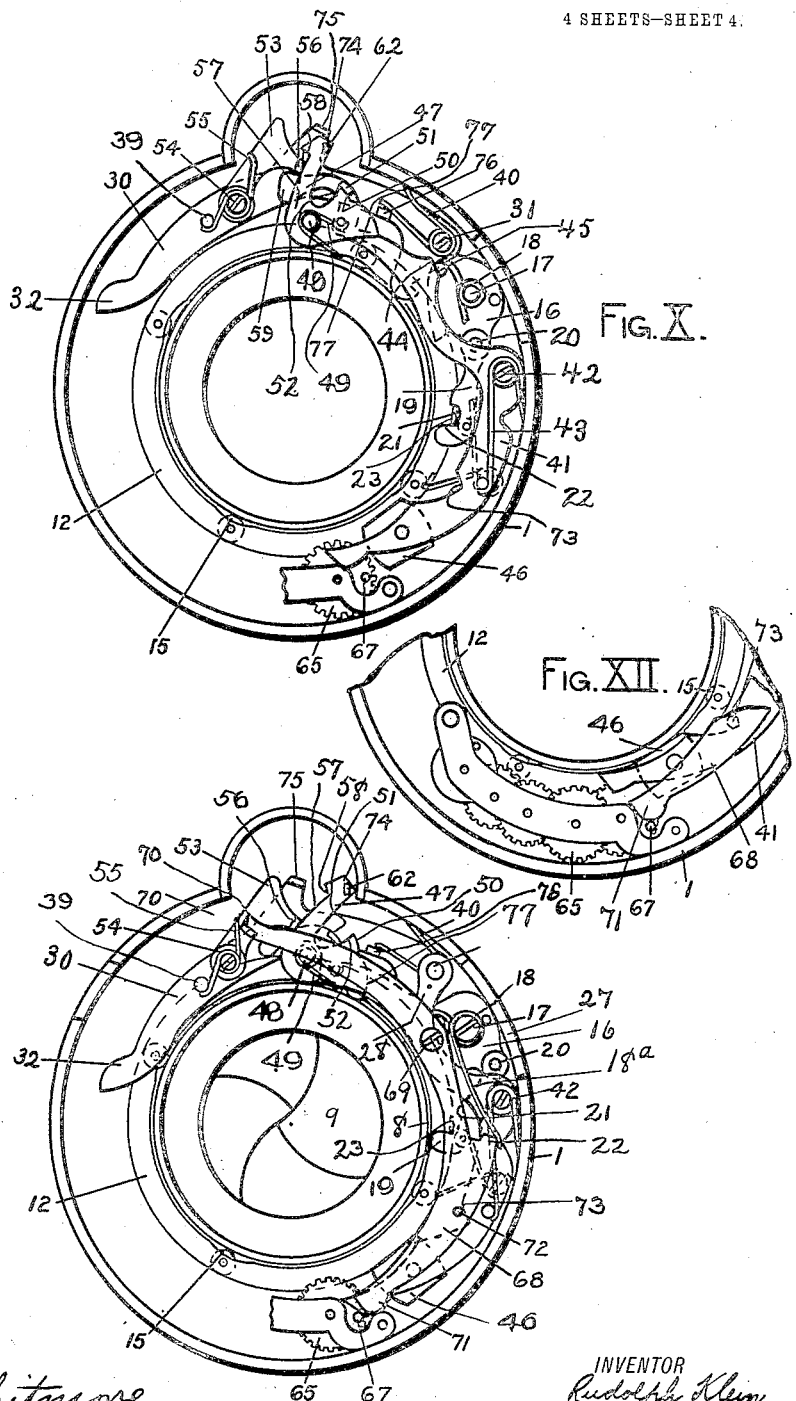

UNITED STATES PATENT OFFICE.

RUDOLPH KLEIN AND THEODOR BRUECK, OF ROCHESTER, NEW YORK.

CAMERA-SHUTTER.

1,122,950.  Specification of Letters Patent.  Patented Dec. 29, 1914.

Application filed December 4, 1911. Serial No. 663,802.

*To all whom it may concern:*

Be it known that we, RUDOLPH KLEIN and THEODOR BRUECK, of Rochester, in the county of Monroe and State of New York, have invented a new and useful Improvement in Camera-Shutters, which improvement is fully set forth in the following specification and shown in the accompanying drawings.

The present invention relates to camera shutters and an object of the same is to provide a construction whereby increased speed may be obtained, while at the same time providing for bulb and graduated time exposures.

Another object of the invention is to improve the shutter mechanism to secure greater ease of action.

Still another object of the invention is to improve the means for shifting the detaining member or detent.

A further object of the invention is to provide an auxiliary retarding device which permits a differentiation between the high speeds.

A still further object is to improve the retarding mechanism.

To these and other ends the invention consists in certain parts and combinations of parts all of which will be hereinafter described, the novel features being pointed out in the appended claims.

In the drawings: Figure 1 is a front view of a shutter construction in accordance with the present invention; Fig. 2 is a central vertical section through the shutter casing with all the parts except portions of the shutter mechanism removed; Fig. 3 is a view with the cover plate removed, together with the setting dial and the lever controlling the retarding mechanism, the shutter parts being illustrated in normal positions; Fig. 4 is a view similar to Fig. 3 with the parts in set position; Fig. 5 is a view similar to Fig. 3 with the controlling lever of the retarding device shown in one position for instantaneous exposure; Fig. 6 is a detail view illustrating the manner in which the intermediate member coöperates with the latch on the bulb lever to prevent the actuation of the detaining member when the shutter is set for time exposure; Fig. 7 illustrates the connection between the motor or master member and the intermediate member, and the connection between the motor or master member and the shutter mechanism when the parts are in normal positions; Fig. 8 is a detail view illustrating the master or motor member in set position with its connection to the shutter mechanism; Fig. 9 is a view of the shutter blades, one of the blades being removed; Fig. 10 shows the positions of the parts when the shutter is open, the detaining member engaging the intermediate member and being so located that it may be engaged by the latch on the bulb lever; Fig. 11 shows the manner in which the intermediate member is held out of operation by the lever which controls the retarding mechanism; and Fig. 12 illustrates the manner in which the controlling lever holds out the retarding mechanism.

According to this invention there is provided a casing comprising preferably a ring 1 divided by a partition 2 into two chambers indicated in the drawing as 3 and 4, the chamber 3 being closed by a member 5, and the chamber 4 being closed by a cover plate 6 and the dial plate 7. The partition 2 has an aperture, and a lens barrel 8 projects from the partition about such aperture. The shutter mechanism, in this instance, comprises a plurality of blades 9 which are loosely fulcrumed on pins 10 projecting from the partition 2 into the chamber 3 of the casing, the blades preferably having slots 11 in which the pins 10 work. For operating the blades there may be provided a ring 12 arranged within the chamber 4 about the lens barrel 8 and having projections 13 thereon extending through slots 14 in the partition 2 to engage the blades to one side of their pivots 10, said pins or projections 13 each having turning thereon a roller or disk 15 the periphery of which turns on the lens barrel 8.

The operating mechanism for the shutter may comprise a motor or master member 16 which, in this instance, swings about an axis or post 17 and is normally held in one direction by a coil spring 18. This motor member may be adapted to connect directly with the shutter mechanism, this connection, in this instance, being such that in one direction of the movement of the master member, the shutter mechanism is not affected, while, in the other direction of movement of the master member, the opening and the closing of the shutter is effected. This lost motion connection may consist (see in detail Fig. 8) of a latch 19 pivoted at 20 and having shoulders 21 and 22 for coöperation with a projection 23 on the ring 12. A spring 24 has one arm coöperating with the ring 12 to hold normally the shutter blades closed, and another arm coöperating with the latch 19 to hold the latter in engagement with the shoulder 23 on the ring 12. With this construction, when the motor member is shifted to store energy in the spring 18, the latch 19 rides over the projection 23 without affecting the shutter mechanism, but, upon the return movement of the motor member, the shoulder 21 first engages the projection 23 to shift the ring 12 and open the shutter, after which the projection 23 is engaged by the shoulder 22 and the shutter is pulled closed. In this instance, the shutter is of the type known commercially as a setting shutter, wherein the motor or master member, after being moved to store energy therein, is held until released by suitable actuating devices, the master member preferably having a setting arm 25 detachably secured to the post 17 by a screw 26 and extending to the exterior of the shutter case through a slot 27 in the ring 1. After it has been shifted by means of the arm 25, the motor or master member is held in set position by a detent or detaining member 28 engaging with a shoulder 29 on the motor member.

For the purpose of moving the detaining member 28 to release the motor or master member, actuating devices are employed comprising preferably a bulb lever 30 pivoted at 31 and having its free end 32 coöperating with a piston 33 operating in a cylinder 34 to which air is delivered by a bulb or other compressor connected to the nipple 35. The bulb lever may also be actuated by a thumb lever 36 pivoted at 37 and having an actuating end 38 on the exterior of the casing, its other end coöperating with a projection 39 extending laterally from the bulb lever. The detaining member 28 is, in this instance, rigid with the bulb lever, the spring 40 not only serving to retain the bulb lever in coöperation with its pump piston 33 but also acting to hold the detaining member 28 into coöperative relation with the motor or master member. One of the features of this case is the member 41 which is preferably in the form of a double-armed lever pivoted at 42, moving in a smaller arc than the motor member 16 and having a spring 43 which normally tends to move the shoulder 44 on said lever into the path of a shoulder 45 on the motor or master member 16. The member 41 has two functions: it acts to retard the motor or master member, thus serving as an auxiliary retarding device; and it serves as an intermediate member between the master or motor member 16 and the detaining devices and also between said motor member and the main retarding device. That it may readily serve as a retarder, one arm of the lever 41 may carry a weight 46; and its movement under the action of the spring 43, to vary its retarding action, is controlled preferably by the controlling means of the main retarding device, as will be hereinafter pointed out. When interposed between the motor member and the detaining devices or the main retarding device, the intermediate member 41 serves to reduce the action of the strong motor spring 18 upon the detaining or retarding devices, thus adding to the life of the shutter. The detaining means, in this instance, comprises a member 47 pivoted at 48 and tending to move in one direction under the action of the spring 49, in order to throw a shoulder 50 on the detaining member into the path of a laterally extending shoulder 51 on the member 41, after the latter has moved under the action of the spring 43 so as to move the shoulder 51 out of engagement with the shoulder 52 on the detaining member, providing of course the latter is otherwise free to move. It is apparent that the member 41 in this way controls the action of the detaining member and holds the same out of detaining position as long as it lies in the position shown in Fig. 7.

The position of the detaining member 47, when engaging with the shoulder 51 to hold the shoulder 44 of the member 41 in the path of lugs 45 of the motor member 16 so that the shutter will be held open, is shown in Fig. 10. This figure also illustrates the manner in which the actuating devices coöperate with the detaining member, the actuating device being provided with a dog or latch 53 which may be pivoted at 54 to the bulb lever 30 and pressed in one direction by a spring 55. The dog or latch has a laterally extending shoulder 56 which moves in engagement with the face 57 on the detaining member 47 toward a shoulder 58 on said detaining member. Upon the engagement of the shoulder 56 with the shoulder 58 due to the operation of the bulb lever 30 when the shutter is in open position, the member 47 is shifted to move the shoulder 50 out of the path of the shoulder 51 on the intermediate member 41.

To the end that the detaining member 47 will not be shifted by the latch 53 when the bulb lever 30 is actuated to release the motor member 16, means may be provided for making the latch 53 inoperative during such action of the bulb lever. This means, in this instance, consists of an extension 59 on the intermediate member 41 to engage with the shoulder 56 on the latch 53 and shift the latter so that, during the movement of the bulb lever to release the motor member 16, the shoulder 56 will not engage the shoulder 58, but, after the intermediate member has moved into engagement with the detaining member, the extension 59 moves out of engagement with the shoulder 56 and permits the latter, on the next operation on the bulb lever, to coöperate with the shoulder 58. The position of the extension 59 when coöperating with the shoulder 56 is shown in detail in Fig. 6.

The position of the detaining member is determined by a controlling body 60 which, in this instance, is in the form of a cam rotatable about an axis 61 and having an operating face extending entirely about the same, the portion 60ª of said face coöperating with a lateral projection 62 on the detaining member 47 to determine the position that the shoulder 50 shall assume to the shoulder 51 on the lever 41 for making time, bulb or instantaneous exposures, as will be pointed out hereinafter. The cam is, in this instance, operated by the disk or dial 7 which has a pin or projection 63 operating in a slot 64 in the cam body 60.

The main retarding device is preferably in the form of a train of wheels 65 geared together and moved in one direction by a spring 66. One of the wheels 65 has a lateral projection or swinging device 67 adapted to coöperate with an end of one arm of the intermediate member 41 to retard the movement of the latter and consequently the movement of the motor or master member 16, the member 41 moving the train of wheels against the action of the spring 66 and holding said spring compressed until the member 41 moves under the action of its spring 43 when the train of gears follows up the member 43 if said train is not otherwise held.

It is apparent that, if the distance which the projection 67 returns under the action of the spring 66 be varied, the retarding action of said train of gears on the intermediate member 41 and the motor member 16 will be varied. For controlling this return action there may be employed a controlling lever 68 preferably pivoted at 69 between its ends to provide two arms, one of which is formed with a lateral shoulder 70 for coöperation with the surface 60ᵇ on the cam 60 so that the retarding device will be controlled by a single body which also controls the detaining member. The other arm of the lever 68 is formed at 71 to coöperate with the projection 67 on one of the wheels of the retarding train, this end being shifted by the cam to determine the distance the projection 67 shall travel under the action of the spring 66. The lever 68 also varies the action of the auxiliary retarder 41 and to this end may have a laterally extending shoulder 72 for coöperation with a shoulder 73 on the member 41. The end 71 of the lever 68 is so formed that when the projection 67 is held by the end of the member 41 said end 71 may move relatively to the projection 67, so that the laterally extending shoulder 72 will move into engagement with the shoulder 73 on the member 41 and hold the latter against any movement whatsoever under the action of spring 43, when the member 16 is shifted to store up energy in the motor spring 18, and in this way the motor member 16 may move to close the shutter without being affected either by the main or by the auxiliary retarding device. The lever 68 is held against the cam by an arm 18ª on the spring 18 and by this means the tension of the spring 18 is varied as the lever 68 is shifted, thus producing a variation of the tension in the motor spring for different speeds.

*Highest speed.*—The highest speed is obtained by adjusting the lever 68 so that the projection 72 engages the shoulder 73 and holds the member 41 against movement under the action of the spring 43. This increases the tension of the spring 18 to the highest. When the member 25 is shifted by hand to store energy in the spring 18, the shoulder 28 on the bulb lever engages the shoulder 29 on the motor member 16, and connection is established between the latch 19 and the projection 23 on the ring 12. When the bulb lever is actuated, the motor member 16 is released, permitting the full force of the spring 18 to effect the opening and the closing of the shutter, the shoulder 44 on the member 41 being entirely out of the path of the shoulder 45 of the motor member 6.

*Auxiliary retarding.*—This is effected by letting the shoulder 44 of the member 41 more or less into the path of the shoulder 45 of the motor member 16. The controlling lever 68 varies this retarding action by holding the member 41 at any point between the two limits of movement of said member 41, while at the same time holding the main retarding device or train of wheels 65 out of the path of the member 41.

*Main retarding.*—For still slower speeds, the main retarding device is thrown into action by the lever 68 which is shifted to the position shown in Fig. 5 for the slowest speed, and at various positions between the position shown in Fig. 5 and that shown in Fig. 12 for other slow speeds. With this adjustment, the projection 67 follows up the lever 41, under the action of the spring 66, upon the setting of the shutter, so that, upon the return movement of the member 41 under the action of the motor member 16, the train of wheels retards the action of the member 41 and consequently retards the movement of the motor member 16.

*Time exposure.*—This is effected by letting the shoulder 50 on the detaining member 47 move into the path of the projection 51 on the intermediate member 41, and the shoulder 74 on the detaining member move into the path of the laterally extending shoulder 75 on the bulb lever. When the motor member 16 is shifted to store energy therein, the lever 41 follows up the member 16 under the action of the spring 43, causing the end 59 of the member 41 to engage with the projection 56 of the dog 53, to shift such projection so that it will not engage the shoulder 58 on the detaining member 47 when the bulb lever 30 is first actuated. On the first actuation of the bulb lever, the detaining member 28 disengages from the shoulder 29 on the motor member 16 permitting the motor member to move and shift the member 41 until the shoulder 51 on the latter engages the shoulder 50 on the detaining member, thus holding the shutter open. Upon the next actuation of the bulb lever 30, the shoulder 56 on the latch 53 will engage the shoulder 58 on the detaining member because the extension 59 on the member 41 moved out of engagement with the latch when the shutter opened. By the engagement of the shoulder 56 with the shoulder 58, the detaining member is kicked out of the path of the member 41 so that the latter may move and permit the motor member to close the shutter.

*Bulb exposure.*—For bulb exposure the detaining member does not move such a distance that the shoulder 74 thereof will be engaged by the lateral shoulder 75 on the bulb lever; otherwise, when the shutter is set, the parts are actuated the same as for time exposure. Upon the pressure of the bulb, after the shutter is set, the shoulder 51 on the member 41 moves into engagement with the shoulder 50 on the detaining member. Upon the release of the bulb pressure, a lateral shoulder 76 on the bulb lever 30 coöperates with a shoulder 77 on the detaining member 47 and kicks the shoulder 50 out of the path of the shoulder 51 on the intermediate member 41, thus permitting the latter to move under the action of the motor member 16.

A camera shutter constructed in accordance with this invention is strong and durable in use while giving accuracy and effective speed. The shutter mechanism is of a simple construction giving ease of action. The motor member is connected to the retarding device and the detaining member through an intermediate member which permits a strong motor spring to be employed without imposing the jar therefrom directly upon the detaining member and the retarding device. This intermediate member acts as an auxiliary retarding device which provides for a greater variety of speeds.

What we claim as our invention and desire to secure by Letters Patent is:

1. In a camera shutter, the combination with a casing having an apertured partition provided with slots and a lens tube projecting from the partition about the aperture, of a ring surrounding the lens tube on one side of the partition, pins extending from the ring through the slots of the partitions, rollers turning on said pins and bearing on the lens tube, and shutter blades on the opposite side of the partition, actuated by the pins.

2. In a camera shutter, the combination with a shutter mechanism, of an operating mechanism therefor comprising a motor or master member having connection with the shutter mechanism for operating the same, an intermediate member arranged in the path of the master member, and detaining means coöperating with said intermediate member to hold the shutter open.

3. In a camera shutter, the combination with a shutter mechanism, of a swinging motor member having a lost motion connection with a shutter mechanism to permit the motor member to be moved in one direction without affecting the shutter mechanism and to effect the opening and the closing of the shutter mechanism by the movement in the other direction, an intermediate lever having a portion arranged in the path of the swinging motor member and movable in a smaller arc than the latter, and detaining means coöperating with the intermediate lever to hold the shutter open.

4. In a camera shutter, the combination with a shutter mechanism, of a swinging motor member having an operating portion, an intermediate lever movable in a smaller arc than the motor member and having a portion lying in the path of the motor member, a detaining member for holding the motor member after energy has been stored therein, a detaining member for holding the motor member after energy has been stored therein, a detaining member for coöperation with the intermediate member for holding the shutter open, and releasing means common to both detaining members having one movement to free the motor member and another movement to free the intermediate member.

5. In a camera shutter, the combination with a shutter mechanism, of a motor member connected to the shutter mechanism to actuate the same by a movement in one direction, an intermediate lever arranged in the path of the motor member, a detaining member for holding the motor member with energy stored therein, a detaining member for coöperating with the intermediate member to hold the shutter open, a lever to which the first named detaining member is rigidly secured, and a latch pivoted to said last mentioned lever and adapted to coöperate with the other detaining member to shift the latter from the path of the intermediate lever.

6. In a camera shutter, the combination with a shutter mechanism, of a motor member connected to the shutter mechanism to actuate the same by a movement in one direction, an intermediate member in the path of the motor member, a detaining member coöperating with the intermediate member to hold the shutter open, a bulb lever having a detaining member for holding the motor member with energy stored in the latter, and a pivoted latch on the bulb lever for engagement with the first named detaining member.

7. In a camera shutter, the combination with a shutter mechanism, of a motor member having a lost motion connection with the shutter mechanism permitting the motor member to be moved in one direction without affecting the shutter mechanism and to effect the opening and closing of the shutter mechanism by the movement in the other direction, an intermediate member, a spring tending to hold said intermediate member in the path of the motor member, a detaining member for preventing movement of the intermediate member in the opposite direction, a detaining member for the motor member, a lever to which said last mentioned member is connected, a latch on the lever for shifting the detaining member of the intermediate member, and a device on the intermediate member holding said latch from actuating said detaining member until the motor device is released.

8. In a camera shutter, the combination with a shutter mechanism, of a motor member having a lost motion connection with the shutter mechanism permitting the motor member to be moved in one direction without affecting the shutter mechanism and to effect the opening and closing of the shutter mechanism by the movement in the other direction, an intermediate member arranged in the path of the motor member, detaining means coöperating with the intermediate member, and retarding mechanism also coöperating with the intermediate member.

9. In a camera shutter, the combination with a shutter mechanism, of a motor member having a lost motion connection with the shutter mechanism permitting the motor member to be moved in one direction without affecting the shutter mechanism and to effect the opening and closing of the shutter mechanism by the movement in the other direction, a two-armed intermediate lever arranged to be engaged by the motor member, detaining means coöperating with one arm of said lever to hold the shutter open, and retarding means coöperating with the other arm of said lever to retard the movement of the motor device.

10. In a camera shutter, the combination with a shutter mechanism, of a motor member having a lost motion connection with the shutter mechanism permitting the motor member to be moved in one direction without affecting the shutter mechanism and to effect the opening and closing of the shutter mechanism by the movement in the other direction, an intermediate member adapted to be engaged by the motor member when the latter is moving to open and close the shutter, a spring for moving the intermediate member into the path of the motor member, a detaining member coöperating with the intermediate member, and means for holding the intermediate member when the motor member is being moved to store energy in it.

11. In a camera shutter, the combination with a shutter mechanism, of a motor member having connection with the shutter mechanism to open and close the shutter, an intermediate member engaged by the motor member in moving to open and close the shutter, and a spring-pressed detaining member for coöperation with the intermediate member, normally held by the latter against the action of its spring.

12. In a camera shutter, the combination with a shutter mechanism, of a motor member having connection with the shutter mechanism to open and close the shutter, an intermediate lever for coöperation with the motor member, a spring for moving the intermediate member into the path of the motor member, a detaining member for coöperation with the intermediate member to hold the shutter open, a spring for moving the detaining member to detaining position, and coöperating portions on the detaining member and the intermediate member for preventing the movement of the former until the latter has moved under the action of its spring.

13. In a camera shutter, the combination with a shutter mechanism, of an operating mechanism therefor embodying a lever moving in one direction during the opening and the closing of the shutter, a detaining member coöperating with said lever to hold the shutter open, and actuating devices embodying a pivoted latch for coöperating with the detaining member to shift the latter out of the path of the lever, said actuating devices having two movements, one to effect the movement of the lever to open the shutter and the other to shift the detaining member, and the lever having a portion coöperating with the latch on the first movement to prevent the shifting of the detaining member.

14. In a camera shutter, the combination with a shutter mechanism, of an operating mechanism therefor embodying a lever movable in one direction during the opening and closing of the shutter, a detaining member coöperating with said lever to hold the shutter open, actuating devices embodying a bulb lever having a latch pivoted thereto for coöperating with the detaining member to shift the latter from the path of the first named lever, said bulb lever having two movements, one to effect the movement of the first named lever to open the shutter, and the other to shift the detaining member, the first named lever having a portion for coöperation with the latch on the first movement to prevent the shifting of the detaining member.

15. In a camera shutter, the combination with a shutter mechanism, of a detaining member adapted to coöperate with parts of the shutter to hold the shutter open, and a pivoted bulb lever for controlling the action of the shutter having a latch pivoted thereto for engaging the detaining member to shift the latter from detaining position.

16. In a camera shutter, the combination with a shutter mechanism, of a detaining member adapted to coöperate with parts of the shutter to held for holding the shutter open, a bulb lever having two movements, one to effect the opening of the shutter and the other to effect the closing, said lever having a latch pivoted thereto for engaging and shifting the detaining member on the second movement, and means for preventing such latch engaging the detaining member on the first movement.

17. In a camera shutter, the combination with a shutter mechanism, of a motor member having a lost motion connection with the shutter mechanism permitting the motor member to be moved in one direction without affecting the shutter mechanism and to effect the opening and closing of the shutter mechanism by the movement in the other direction, means for effecting the movement of said motor member to a position where it may make such movement, detaining means for holding said motor member in such position, a detaining member adapted to coöperate with parts of the shutter to hold said motor member in an intermediate position to hold the shutter open, a bulb lever connected to the first-named detaining means to release the motor member on one action of said bulb lever, a latch pivoted to the bulb lever to engage the second detaining means and shift the latter to release the motor member on a second actuation of the bulb lever, and means for engaging said latch to prevent the latter shifting the detaining member until the second actuation.

18. In a camera shutter, the combination with a shutter mechanism, of a motor member movable in one direction to open and close the shutter, means for effecting the movement of the motor member to a position where it can make such movement, detaining means for holding it in such position, a spring-pressed detaining member for holding the motor member in an intermediate position to hold the shutter open, and actuating devices for controlling both detentions, embodying a latch for coöperating with the spring-pressed detaining member, held out of connection with such detaining member until after the first named detaining means has been actuated.

19. In a camera shutter, the combination with a motor member, of a retarding device for the motor member moved in one direction by said member, and a spring for moving the retarding device in the opposite direction, the connection between the retarding device and the motor member being such that the retarding device does not move under the action of its spring until the motor member is moved to store energy in such motor device.

20. The combination in a camera shutter of a lever, and of a retarding device embodying a train of wheels and a swinging device geared to said train of wheels and engaged by the lever, the latter remaining in engagement with the swinging device after it has completed its movement to open and close the shutter, and a spring for moving the swinging device and the train of wheels as the lever is moved in the other direction.

21. In a camera shutter, the combination with a shutter mechanism and a motor member for operating the shutter mechanism, of a weighted retarding lever, and a spring for moving said lever in the path of the motor member.

22. In a camera shutter, the combination with a shutter mechanism and a motor member for operating the shutter mechanism, of an auxiliary retarding device adjustable in the path of the motor member to vary its action on the motor member, and a main retarding device adjustably connected to the auxiliary retarding device to vary the action of the motor member.

23. In a camera shutter, the combination with a shutter mechanism and a motor mechanism for operating the shutter mechanism, of a pivoted member, a spring acting on the pivoted member to move the latter in the path of the motor member, and a retarding device for said pivoted member.

24. In a camera shutter, the combination with a shutter mechanism and a motor mechanism for operating the shutter mechanism, two retarding devices for the motor member, one acting on the motor member by means of the other, and means for varying the action of both retarding devices.

25. In a camera shutter, the combination with a shutter mechanism, of a motor mechanism for operating the shutter mechanism, two adjustable retarding devices for the motor member, one acting through the other, and a common controlling means for the retarding devices.

26. In a camera shutter, the combination with a motor member, of two retarding devices, one acting directly on the motor member and the other acting on the first one, springs tending to move said retarding devices to retarding positions, and means for determining the movement of said retarding devices under the action of the springs.

27. In a camera shutter, the combination with a shutter mechanism, and a motor member for operating the shutter mechanism, of two retarding devices, one acting on the other and the latter acting on the motor member, and means for rendering inoperative both of said retarding devices or the one acting on the other.

28. In a camera shutter, the combination with a shutter mechanism, and a motor member for operating the shutter mechanism, of two retarding devices, one acting on the other and the latter acting on the motor member, springs for moving said retarding devices into retarding positions, and a single member coöperating with both retarding devices for determining their movements under the action of the springs.

29. In a camera shutter, the combination with a motor member, of a pivoted lever, a spring for moving said lever in the path of the motor member, a retarding device, a spring for moving said retarding device in the path of the lever, and a lever having a portion to coöperate with the retarding device to hold the latter against movement under the action of its spring and a portion to coöperate with the first named lever to hold the same against movement under the action of its spring, said last-named portion being arranged to act only when the retarding device has been held against movement.

30. A photographic shutter having in combination, shutter-blades, exposure-mechanism for actuating the blades to produce an exposure, primary means for yieldingly retarding the movement of the exposure-mechanism, said means being adapted to afford a comparatively slight resistance proportioned to a comparatively short exposure secondary means for yieldingly retarding the exposure-mechanism, the secondary means being adapted to afford greater resistances proportioned to the longer graded exposures, and manually-operable means for throwing the secondary and primary retarding-means successively out of operation to produce exposures graded in duration from long to short.

31. A photographic shutter having in combination, shutter-blades, exposure-mechanism for actuating the blades, a retarder, connecting-means for operatively connecting the retarder with the exposure-mechanism to retard the action of the latter, and a controller for determining the length of exposure; the controller acting upon both the retarder and said connecting-means and being adapted, when moved to different successive positions, first to throw the retarder out of operative position and then to throw the connecting-means out of operative relation to the exposure-mechanism.

32. A photographic shutter having in combination, shutter-blades, exposure-mechanism for actuating the blades, a retarder, a connecting-lever adapted to engage the retarder at one point and a portion of the exposure-mechanism at another point to operatively connect these parts, and a controller for determining the length of exposure; the controller acting upon both the retarder and the connecting-lever and being adapted, when moved to different successive positions, first to move the retarder out of position to operatively engage the connecting-lever, and then to move the connecting-lever out of position to operatively engage the exposure-mechanism.

RUDOLPH KLEIN.
THEODOR BRUECK.

Witnesses:
H. H. SIMMS,
A. M. WHITMORE.